June 26, 1928.  
W. J. LA BEAN  
1,674,829  
WATER COOLED CABLE CONNECTION FOR ELECTRIC WELDING  
Filed Dec. 6, 1926

Inventor  
William Joseph Labean  
By Whittemore Hulbert Whittemore  
& Belknap  
Attorneys Patented June 26, 1928.

1,674,829

UNITED STATES PATENT OFFICE.

WILLIAM JOSEPH LA BEAN, OF DETROIT, MICHIGAN, ASSIGNOR TO BRIGGS MANUFACTURING COMPANY, OF DETROIT, MICHIGAN, A CORPORATION OF MICHIGAN.

WATER-COOLED CABLE CONNECTION FOR ELECTRIC WELDING.

Application filed December 6, 1926. Serial No. 152,945.

This invention relates generally to electric welding apparatus and refers more particularly to the connections between water cooled cables and their terminal attaching lugs.

One of the essential objections of the invention is to provide an improved assembly of this type in which water is supplied through the connection to the cable in such a way that the water will cool the solder used to connect the cable to the attaching lug and at the same time will be effectively prevented from leaking.

Another object is to provide a strong and durable connection which is simple in construction and can be manufactured at a comparatively low cost.

With these and other objects in view, the invention resides in certain novel features of construction, combinations and arrangements of parts as will be more fully described and particularly pointed out in the appended claims.

Figure 1:
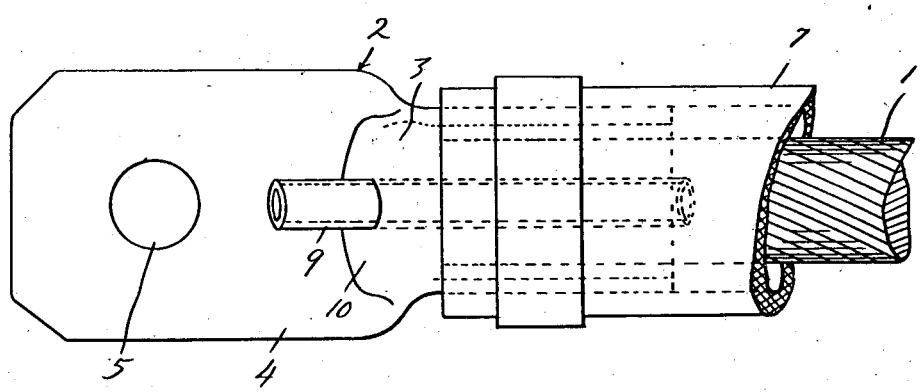
Figure 1 is a fragmentary side elevation of a cable connection embodying my invention.
Figure 2:
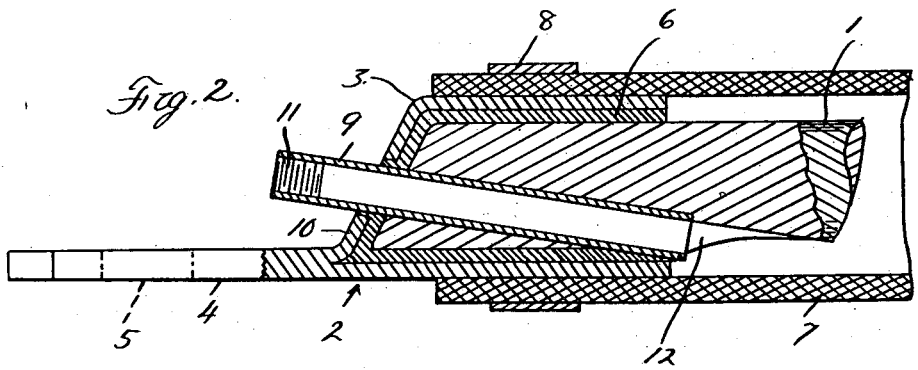
Figure 2 is a longitudinal sectional view through the construction shown in Figure 1.

Referring now to the drawing, 1 is an electrical cable, and 2 is a terminal attaching lug of a connection embodying my invention. As shown, this cable 1 is preferably formed of a number of wires woven into strands so that it will have a high amperage carrying capacity on a low voltage range and will be flexible so that the electrode arm (not shown) to which the lug 2 is preferably attached may be manipulated freely, for instance over the work. Preferably the lug 2 has a socket portion 3 that receives an end of the cable 1 and is provided at the closed end of this socket with a substantially flat attaching ear or flange 4. As shown this flange 4 forms a continuation of one side of the socket 3 and is provided with an aperture 5 through which suitable securing elements may be passed for attaching the lug to the electrode arm (not shown). If desired the opposite end of the cable 1 may be connected in a similar manner to a fixed part such as the frame (not shown) of the apparatus. Preferably the cable 1 is secured in the socket portion 3 of the lug by a layer 6 of solder and is enclosed in a suitable hose 7 which is secured at one end by a clamp 8 to the socket portion 3 of the lug.

In the present instance water used as the cooling medium for the cable 1 is supplied to the hose 7 by means of a tube 9 which preferably extends through the base 10 of the socket and through the cable 1 to a point slightly in rear of the socket. As shown this tube 9 is provided at its outer end with internal threads 11 to which a suitable supply conduit (not shown) may be connected, and extends longitudinally of but at an angle to the cable 1. Preferably the cable is cut away as shown at 12 at the inner end of the tube 9 to provide clearance for water and is so arranged with respect to the hose 7 that the water discharged from the inner end of the tube 9 will flow freely into the hose 7 and between and around the strands of the cable 1. Due to this arrangement the water will cool the solder 6 as well as the cable 1 but will be effectively prevented from leaking. Thus, the present invention is a decided improvement over prior cable connections such as for instance that shown in U. S. Patent No. 1,548,204 dated August 4, 1925. For instance such fittings as 9 and 14 respectively of Moesta have been dispensed with entirely, hence a material saving in costs and expense has been effected, and leakage of water has been obviated entirely. In other words better results are obtained with fewer and simpler parts.

While it is believed that from the foregoing description, the nature and advantage of my invention will be readily apparent, I desire to have it understood that I do not limit myself to what is herein shown and described and that such changes may be resorted to when desired as fall within the scope of what is claimed.

What I claim as my invention is:

1. In an assembly of the class described, the combination with a water cooled cable, and a terminal lug having a socket portion receiving and secured to an end of said cable, of means for supplying water to the cable including an element extending through both said socket portion and cable.

2. In an assembly of the class described, the combination with a terminal lug having a socket portion, a hose sleeved upon and secured to said socket portion, and a cable in the hose secured to said socket portion, of means for supplying a cooling fluid to the hose including means extending through the lug and cable.

3. In an assembly of the class described, the combination with a terminal lug having a socket portion, a hose sleeved upon and secured to said socket portion, and a cable in the hose having an end secured in the socket portion of the lug, of means for supplying a cooling fluid to the hose including a tube extending through the socket portion of the lug and through the cable.

4. In an assembly of the class described, the combination with a hose, a cable in the hose, and a terminal lug having a socket portion within the hose and receiving an end of the cable, and a connection between said cable and socket portion, of means extending through said socket portion and cable for supplying a cooling fluid to the hose, and a connection between the hose and socket portion preventing leakage of said cooling fluid from the hose.

5. In an assembly of the class described, the combination with a cable, and a terminal lug having a socket portion receiving an end of said cable, of a connection between said cable and lug including a layer of solder engaging the cable and socket portion of the lug, a hose for a cooling fluid associated with the cable, and means for supplying a cooling fluid to said hose including a tubular member extending through the connection between said lug and cable.

6. In an assembly of the class described, the combination with a terminal lug having a socket portion, a hose sleeved upon and secured to said socket portion, and a cable in the hose extending into the socket portion of the lug, of a layer of solder securing the cable to the socket portion of the lug, and means extending through the socket portion of the lug and longitudinally of the cable for supplying a cooling fluid to said hose, said means having its discharge end between the cable and hose adjacent to the socket portion of the lug whereby the cooling fluid will cool the solder as well as the cable.

In testimony whereof I affix my signature.

WILLIAM JOSEPH LA BEAN.